US011155358B2

(12) United States Patent
LaVallee, III et al.

(10) Patent No.: US 11,155,358 B2
(45) Date of Patent: Oct. 26, 2021

(54) CATALYTIC FUEL TANK INERTING SYSTEMS FOR AIRCRAFT

(71) Applicant: Hamilton Sundstrand Corporation, Charlotte, NC (US)

(72) Inventors: Earl Jean LaVallee, III, Glastonbury, CT (US); Eric Surawski, Hebron, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 273 days.

(21) Appl. No.: 16/372,943

(22) Filed: Apr. 2, 2019

(65) Prior Publication Data

US 2020/0317359 A1    Oct. 8, 2020

(51) Int. Cl.
| *B64D 37/10* | (2006.01) |
| *B64D 37/24* | (2006.01) |
| *B64D 37/32* | (2006.01) |
| *B64D 37/34* | (2006.01) |

(52) U.S. Cl.
CPC ............. *B64D 37/10* (2013.01); *B64D 37/24* (2013.01); *B64D 37/32* (2013.01); *B64D 37/34* (2013.01)

(58) Field of Classification Search
CPC ........ B64D 37/32; B64D 37/34; B64D 37/24; B64D 37/10
See application file for complete search history.

(56) References Cited

U.S. PATENT DOCUMENTS

| 3,847,298 | A |   | 11/1974 | Hamilton |
| 5,806,316 | A | * | 9/1998 | Avakov ............... F01K 25/06 60/649 |
| 2011/0059377 | A1 |   | 3/2011 | Scotto et al. |
| 2018/0037334 | A1 | * | 2/2018 | Surawski ............ F02M 21/06 |
| 2018/0148190 | A1 |   | 5/2018 | Surawski |
| 2018/0354642 | A1 |   | 12/2018 | Phillips et al. |
| 2018/0354643 | A1 |   | 12/2018 | Pollard et al. |
| 2018/0354644 | A1 |   | 12/2018 | Massie et al. |
| 2018/0370648 | A1 |   | 12/2018 | Rheaume et al. |
| 2019/0283895 | A1 | * | 9/2019 | Emerson ............. B64D 37/32 |

OTHER PUBLICATIONS

European Search Report for European Application No. 19209662.6, International Filing Date Nov. 18, 2019, dated Jul. 6, 2020, 5 pages.

* cited by examiner

*Primary Examiner* — Philip J Bonzell
*Assistant Examiner* — Ashesh Dangol
(74) *Attorney, Agent, or Firm* — Cantor Colburn LLP

(57) ABSTRACT

Fuel tank inerting systems and methods for aircraft are described. The systems and methods include controlling of (i) a first reactant control element, (ii) a second reactant control valve, (iii) a ram air control valve, (iv) a driving mechanism, and (v) a flow control valve, to control a state of a fuel tank inerting system. The states of the fuel tank inerting system include an OFF state, a CIRCULATE state, a PRIME state, a CATWARM state, an ON state, a DEPRESSURIZE state, and a COOLDOWN state, wherein the states are determined in part by a prior state and/or a position/actuation of a given element of the system.

19 Claims, 6 Drawing Sheets

CATALYTIC FUEL TANK INERTING SYSTEMS FOR AIRCRAFT

BACKGROUND

The subject matter disclosed herein generally relates to fuel tank inerting systems for aircraft and, more particularly, to fuel tank inerting systems configured to supply inert gas in an aircraft.

In general, aircraft pneumatic systems, including air conditioning systems, cabin pressurization and cooling, and fuel tank inerting systems are powered by engine bleed air. For example, pressurized air from an engine of the aircraft is provided to a cabin through a series of systems that alter the temperatures and pressures of the pressurized air. To power this preparation of the pressurized air, generally the source of energy is the pressure of the air itself.

The air bled from engines may be used for environmental control systems, such as used to supply air to the cabin and to other systems within an aircraft. Additionally, the air bled from engines may be supplied to inerting apparatuses to provide inert gas to a fuel tank. In other cases, the air may be sourced from compressed RAM air.

Regardless of the source, typically the air for fuel tank inerting is passed through a porous hollow fiber membrane tube bundle known as an "air separation module." A downstream flow control valve is controlled or passively operated to apply back pressure on the air separation module to force some amount of air through the membrane as opposed to flowing though the tube. Oxygen passes more easily through the membrane, leaving only nitrogen enriched air to continue through the flow control valve into the fuel tank. Typically, air separation modules employ a dedicated ram air heat exchanger in conjunction with a bypass valve.

BRIEF DESCRIPTION

According to some embodiments, fuel tank inerting systems for aircraft are provided. The fuel tank inerting systems include a fuel tank, a first reactant source fluidly connected to the fuel tank, the first reactant source arranged to receive fuel from the fuel tank, the first reactant source having a first reactant control element controlling flow thereof, a second reactant source having a second reactant control valve controlling flow thereof, a catalytic reactor arranged to receive a first reactant from the first reactant source and a second reactant from the second reactant source to generate an inert gas to be supplied to the fuel tank to fill an ullage space of the fuel tank, a heat exchanger arranged between the catalytic reactor and the fuel tank and configured to at least one of cool and condense an output from the catalytic reactor to separate out the inert gas, a ram air control valve configured to control flow of ram air into the heat exchanger, a recirculation loop having a driving mechanism therein, configured to drive a flow of gas through the fuel tank inerting system, a flow control valve arranged between the catalytic reactor and the ullage space, the flow control valve configured to control a flow of inert gas into the ullage space, and a controller. The controller is configured to control operation of (i) the first reactant control element, (ii) the second reactant control valve, (iii) the ram air control valve, (iv) the driving mechanism, and (v) the flow control valve, the controller configured to control a state of the fuel tank inerting system, wherein states of the fuel tank inerting system comprise an OFF state, a CIRCULATE state, a PRIME state, a CATWARM state, an ON state, a DEPRESSURIZE state, and a COOLDOWN state.

In addition to one or more of the features described above, or as an alternative, further embodiments of the fuel tank inerting systems may include a recirculation heat exchanger arranged within the recirculation loop and configured to thermally connect a flow through the recirculation loop and a flow exiting the catalytic reactor.

In addition to one or more of the features described above, or as an alternative, further embodiments of the fuel tank inerting systems may include that, in the OFF state, the second reactant control valve is fully closed, the ram air control valve is fully open, the driving mechanism is off, the flow control valve is fully closed, and the first reactant control element is off.

In addition to one or more of the features described above, or as an alternative, further embodiments of the fuel tank inerting systems may include that, in the CIRCULATE state, the second reactant control valve is fully closed, the ram air control valve is fully open, the driving mechanism is on, the flow control valve is fully closed, and the first reactant control element off.

In addition to one or more of the features described above, or as an alternative, further embodiments of the fuel tank inerting systems may include that operation of the driving mechanism causes a temperature within the fuel tank inerting system to increase.

In addition to one or more of the features described above, or as an alternative, further embodiments of the fuel tank inerting systems may include that the temperature increase is caused by waste heat generated by the driving mechanism.

In addition to one or more of the features described above, or as an alternative, further embodiments of the fuel tank inerting systems may include that, in the PRIME state, the second reactant control valve is fully closed, the ram air control valve is modulated to cause a temperature at an inlet of the catalytic reactor to reach a lightoff temperature, the driving mechanism is on, the flow control valve is fully closed, and the first reactant control element is off.

In addition to one or more of the features described above, or as an alternative, further embodiments of the fuel tank inerting systems may include that, in the CATWARM state, the second reactant control valve is fully closed, the ram air control valve is modulated to cause a temperature at an inlet of the catalytic reactor to reach a lightoff temperature, the driving mechanism is on, the flow control valve is fully closed, and the first reactant control element is off.

In addition to one or more of the features described above, or as an alternative, further embodiments of the fuel tank inerting systems may include that a temperature at an outlet of the catalytic reactor is monitored for a predetermined period of time.

In addition to one or more of the features described above, or as an alternative, further embodiments of the fuel tank inerting systems may include that, in the ON state, the second reactant control valve is fully open, the ram air control valve is open, the driving mechanism is on, the flow control valve is open, and the first reactant control element is operated to supply fuel to the catalytic reactor.

In addition to one or more of the features described above, or as an alternative, further embodiments of the fuel tank inerting systems may include that, in the DEPRESSURIZE state, the second reactant control valve is fully closed, the ram air control valve is open, the driving mechanism is on, the flow control valve is open, and the first reactant control element is off.

In addition to one or more of the features described above, or as an alternative, further embodiments of the fuel tank inerting systems may include that, in the COOLDOWN state, the second reactant control valve is fully closed, the ram air control valve is fully open, the driving mechanism is on, the flow control valve is fully closed, and the first reactant control element is off.

According to some embodiments, methods of controlling operation of fuel tank inerting systems of aircraft are provided. The methods include controlling a state of (i) a first reactant control element, (ii) a second reactant control valve, (iii) a ram air control valve, (iv) a driving mechanism, and (v) a flow control valve to control a state of the fuel tank inerting system, wherein states of the fuel tank inerting system comprise an OFF state, a CIRCULATE state, a PRIME state, a CATWARM state, an ON state, a DEPRESSURIZE state, and a COOLDOWN state.

In addition to one or more of the features described above, or as an alternative, further embodiments of the methods may include that, in the OFF state, the second reactant control valve is fully closed, the ram air control valve is fully open, the driving mechanism is off, the flow control valve is fully closed, and the first reactant control element is off.

In addition to one or more of the features described above, or as an alternative, further embodiments of the methods may include that, in the CIRCULATE state, the second reactant control valve is fully closed, the ram air control valve is fully open, the driving mechanism is on, the flow control valve is fully closed, and the first reactant control element off.

In addition to one or more of the features described above, or as an alternative, further embodiments of the methods may include that, in the PRIME state, the second reactant control valve is fully closed, the ram air control valve is modulated to cause a temperature at an inlet of a catalytic reactor to reach a lightoff temperature, the driving mechanism is on, the flow control valve is fully closed, and the first reactant control element is off.

In addition to one or more of the features described above, or as an alternative, further embodiments of the methods may include that, in the CATWARM state, the second reactant control valve is fully closed, the ram air control valve is modulated to cause a temperature at an inlet of a catalytic reactor to reach a lightoff temperature, the driving mechanism is on, the flow control valve is fully closed, and the first reactant control element is off.

In addition to one or more of the features described above, or as an alternative, further embodiments of the methods may include that, in the ON state, the second reactant control valve is fully open, the ram air control valve is open, the driving mechanism is on, the flow control valve is open, and the first reactant control element is operated to supply fuel to a catalytic reactor.

In addition to one or more of the features described above, or as an alternative, further embodiments of the methods may include that, in the DEPRESSURIZE state, the second reactant control valve is fully closed, the ram air control valve is open, the driving mechanism is on, the flow control valve is open, and the first reactant control element is off.

In addition to one or more of the features described above, or as an alternative, further embodiments of the methods may include that, in the COOLDOWN state, the second reactant control valve is fully closed, the ram air control valve is fully open, the driving mechanism is on, the flow control valve is fully closed, and the first reactant control element is off.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1A:
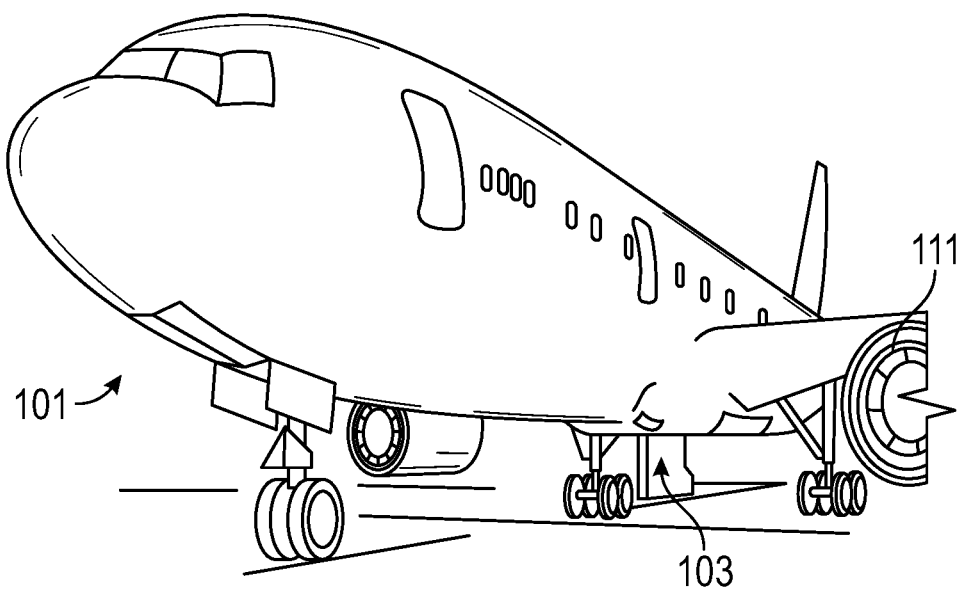
FIG. 1A is a schematic illustration of an aircraft that can incorporate various embodiments of the present disclosure.
Figure 1B:
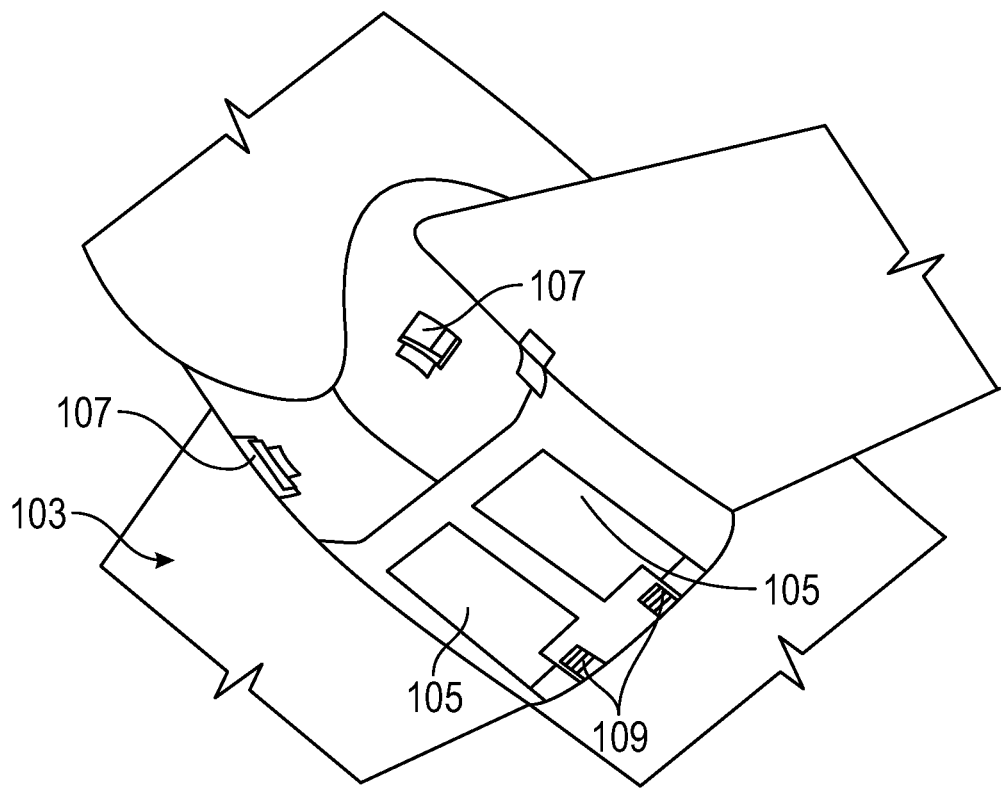
FIG. 1B is a schematic illustration of a bay section of the aircraft of FIG. 1A.

FIGS. 1A-1B are schematic illustrations of an aircraft 101 that can employ one or more embodiments of the present disclosure. As shown in FIGS. 1A-1B, the aircraft 101 includes bays 103 beneath a center wing box. The bays 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhausted through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve a desired oxygen separation. Such systems require a high pressure pneumatic source to drive the separation process across the membrane.

Further, the hollow fiber membrane separators commonly used are relatively large in size and weight, which is a significant consideration with respect to aircraft (e.g., reductions in volume and weight of components can improve flight efficiencies). Embodiments provided herein provide reduced volume and/or weight characteristics of inert-gas or low-oxygen supply systems for aircraft. Further, embodiments provided herein can prevent humid air from entering fuel tanks of the aircraft, thus preventing various problems that may arise with some fuel system components. In accordance with some embodiments of the present disclosure, the typical hollow fiber membrane separator is replaced by a catalytic system (e.g., $CO_2$ generation system), which can be, for example, smaller, lighter, and/or more efficient than the typical fiber membrane separators. That is, in accordance with embodiments of the present disclosure, the use of hollow fiber membrane separators may be eliminated.

A function of fuel tank flammability reduction systems in accordance with embodiments of the present disclosure is accomplished by reacting a small amount of fuel vapor (e.g., a "first reactant") with a source of gas containing oxygen (e.g., a "second reactant"). The product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material is used to induce a chemical reaction, including, but not limited to, precious metal materials. The carbon dioxide that results from the reaction is an inert gas that is mixed with nitrogen naturally found in fresh/ambient air, and is directed back within a fuel tank to create an inert environment within the fuel tank, thus reducing a flammability of the vapors in the fuel tank. Further, in some embodiments, the fuel tank flammability reduction or inerting systems of the present disclosure can provide a functionality such that water vapor from the atmosphere does not enter the fuel tanks during descent stages of flight of an aircraft. This can be accomplished by controlling a flow rate of inert gas into the fuel tank so that a positive pressure is continuously maintained in the fuel tank.

In accordance with embodiments of the present disclosure, a catalyst is used to induce a chemical reaction between oxygen ($O_2$) and fuel vapor to produce carbon dioxide ($CO_2$) and water vapor. The source of $O_2$ used in the reaction can come from any of a number of sources, including, but not limited to, pneumatic sources on an aircraft that supply air at a pressure greater than ambient. The fuel vapor is created by draining a small amount of fuel from an aircraft fuel tank into an evaporator container. The fuel can be heated to vaporize the fuel and generate the first reactor (fuel vapor), such as by using an electric heater, as will be appreciated by those of skill in the art. The fuel vapor is removed from the evaporator container, in some embodiments, by an ejector which can induce a suction pressure that pulls the fuel vapor out of the evaporator container. Such ejectors can utilize elevated pressures of a second reactant source containing $O_2$ (e.g., a pneumatic source) to induce a secondary flow of the ejector which is sourced from the evaporator container. As such, the ejector can be used to mix the extracted fuel vapor with the $O_2$ from a second reactant source.

The mixed air stream (fuel vapor and oxygen or air) is then introduced to a catalyst, which induces a chemical reaction that transforms the $O_2$ and fuel vapor into $CO_2$ and water vapor. Any inert gas species that are present in the mixed stream (for example, Nitrogen), will not react and will thus pass through the catalyst unchanged. In some embodiments, the catalyst is in a form factor that acts as a heat exchanger. For example, in one non-limiting configuration, a plate fin heat exchanger configuration is employed wherein a hot side of the heat exchanger would be coated with catalyst material. In such an arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

As noted above, the catalytic chemical reaction generates water vapor. Having water (in any form) enter primary fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses and drops out of the product gas stream (i.e., condenses an output of the catalytic reactor). The liquid water can then be drained overboard. In some embodiments, an optional water separator can be used to augment or provide water separation from the product stream.

In some embodiments, a flow control valve meters a flow of an inert gas (with water vapor removed therefrom) to a predetermined and/or controlled inert gas flow rate. Further, in some embodiments, an optional fan can be used to boost the inert gas stream pressure to overcome a pressure drop associated with ducting and flow lines between the catalyst and a fuel tank into which the inert gas is supplied. In some embodiments, a flame arrestor can be arranged at an inlet to the fuel tank (where the inert gas enters) to prevent any potential flames from propagating into the fuel tank.

Independent of any aircraft flammability reduction systems, aircraft fuel tanks are typically vented to ambient. At altitude, pressure inside the fuel tank is very low and is roughly equal to ambient pressure. However, during descent, the pressure inside the fuel tank needs to rise to equal ambient pressure at sea level (or at whatever altitude the aircraft is landing). The change in pressures requires gas entering the tank from outside to equalize the pressure. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water from entering the fuel tank.

Figure 2:
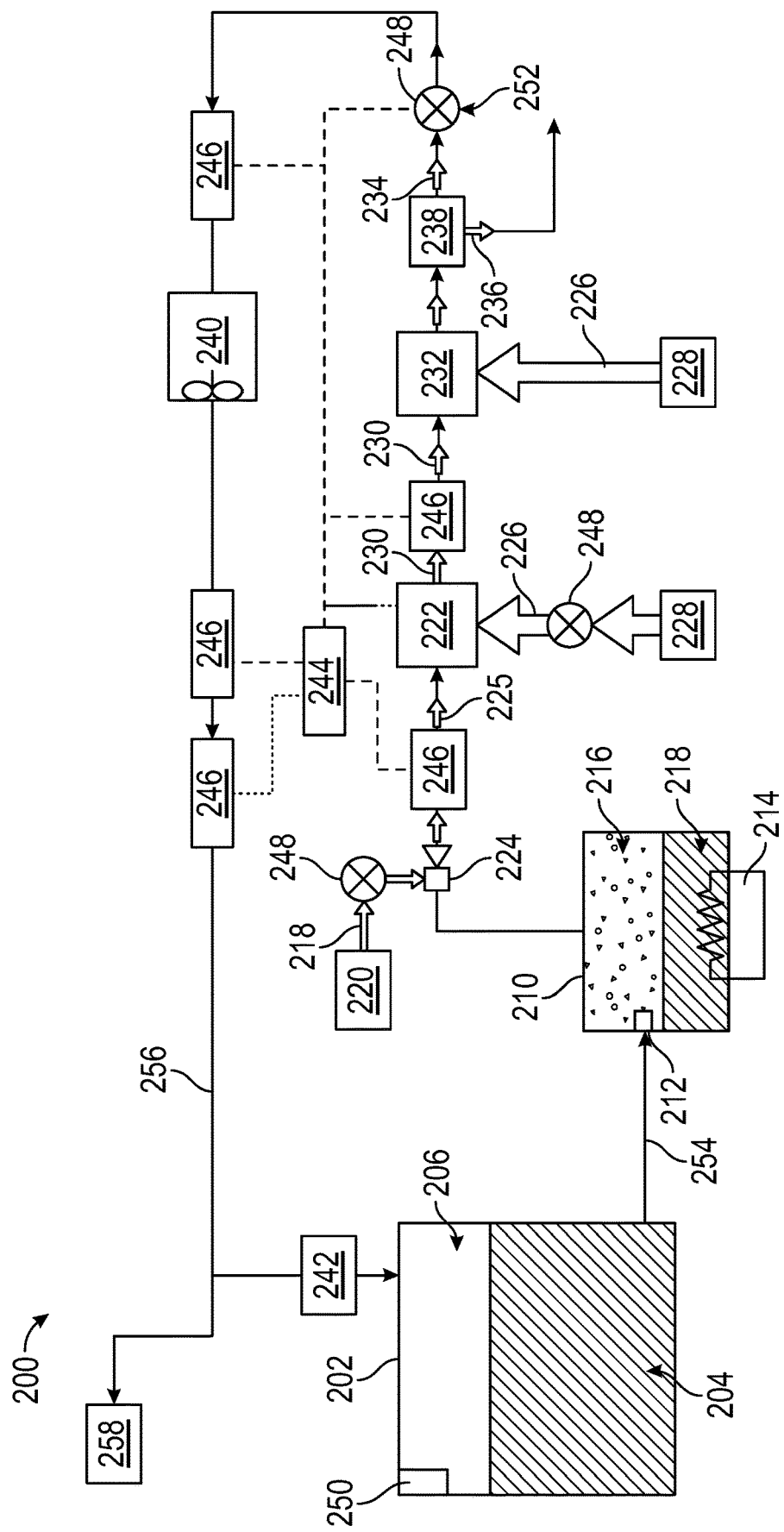
FIG. 2 is a schematic illustration of a fuel tank inerting system in accordance with an embodiment of the present disclosure.

FIG. 2 is a schematic illustration of a flammability reduction or inerting system 200 utilizing a catalytic reaction to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

In accordance with embodiments of the present disclosure, an inerting fuel 208 can be extracted from the fuel tank 202 and into an evaporator container 210. The amount of fuel 204 that is extracted into the evaporator container 210 (i.e., the amount of inerting fuel 208) can be controlled by an evaporator container valve 212, such as a float valve. The inerting fuel 208, which may be in liquid form when pulled from the fuel tank 202, can be vaporized within the evaporator container 210 using a heater 214, such as an electric heater, to generate a first reactant 216. The first reactant 216 is a vaporized portion of the inerting fuel 208 located within the evaporator container 210. The first reactant 216 is mixed with a second reactant 218 which is sourced from a second reactant source 220. The second reactant 218 is air containing oxygen that is catalyzed with the first reactant 216 to generate an inert gas to be supplied into the ullage space 206 of the fuel tank 202. The second reactant 218 can come from any source on an aircraft that is at a pressure greater than ambient, including, but not limited to bleed air from an engine, cabin air, high pressure air extracted or bled from an engine, etc. (i.e., any second reactant source 220 can take any number of configurations and/or arrangements). The first reactant 216 within the evaporator container 210 and the second reactant 218 can be directed into a catalytic reactor 222 by and/or through a mixer 224, which, in some embodiments, may be an ejector or jet pump. The mixer 224 will mix the first and second reactants 216, 218 into a mixed air stream 225.

The catalytic reactor 222 can be temperature controlled to ensure a desired chemical reaction efficiency such that an inert gas can be efficiently produced by the inerting system 200 from the mixed air stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236. That is, the heat exchanger 232 may condense an output of the catalytic reactor 222. A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be liquid water or water vapor, and thus in the present configuration shown in FIG. 2, a water separator 238 is provided downstream of the heat exchanger 232 to extract the liquid water or water vapor from the catalyzed mixture 230, thus leaving only the inert gas 234 to be provided to the ullage space 206 of the fuel tank 202.

The inerting system 200 can include additional components including, but not limited to, a fan 240, a flame arrestor 242, and a controller 244. Various other components can be included without departing from the scope of the present disclosure. Further, in some embodiments, certain of the included components may be optional and/or eliminated. For example, in some arrangements, the fan 240 and/or the water separator 238 can be omitted. The controller 244 can be in operable communication with one or more sensors 246 and valves 248 to enable control of the inerting system 200.

In one non-limiting example, flammability reduction is achieved by the inerting system 200 by utilizing the catalytic reactor 222 to induce a chemical reaction between oxygen (second reactant 218) and fuel vapor (first reactant 216) to produce carbon dioxide (inert gas 234) and water in vapor phase (byproduct 236). The source of the second reactant 218 (e.g., oxygen) used in the reaction can come from any source on the aircraft that is at a pressure greater than ambient. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, as noted above, the mixer 224 is used to mix the two gas streams (first and second reactants 216, 218) together to form the mixed air stream 225.

The mixed air stream 225 (e.g., fuel vapor and oxygen or air) is then introduced to the catalytic reactor 222, inducing a chemical reaction that transforms the mixed air stream 225 (e.g., fuel and air) into the inert gas 234 and the byproduct 236 (e.g., carbon dioxide and water vapor). It is noted that any inert gas species that are present in the mixed air stream 225 (for example, nitrogen) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the temperature of the hot mixed gas stream 225 is hot enough to sustain the chemical reaction desired within the catalytic reactor 222, but cool enough to remove the heat generated by the exothermic reaction, thus maintaining aircraft safety and materials from exceeding maximum temperature limits.

As noted above, the chemical reaction process within the catalytic reactor 222 can produce byproducts, including water in vapor form. It may be undesirable to have water (in any form) enter the fuel tank 202. Accordingly, water byproduct 236 can be removed from the product gas stream (i.e., inert gas 234) through condensation. To achieve this, catalyzed mixture 230 enters the heat exchanger 232 that is used to cool the catalyzed mixture 230 such that the byproduct 236 can be removed (e.g., a majority of the water vapor condenses and drops out of the catalyzed mixture 230). The byproduct 236 (e.g., liquid water) can then be drained overboard. An optional water separator 238 can be used to accomplish this function.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize the pressure. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

As noted above, the controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258, as schematically shown.

A catalytic fuel tank inerting system, such as that shown and described with respect to FIG. 2, may generate $CO_2$ (inert gas) for the fuel tank ullage by reacting a fuel-air mixture in a catalytic reactor. Reactions will only start on the catalyst surface once a minimum temperature ("light-off" temperature) has been achieved. This light-off temperature can be a function of several variables, including space velocity, fuel concentration (e.g., air-to-fuel ratio ("AFR")) and catalyst composition. As noted above, bleed air may be used as a primary air source for the catalytic fuel tank inerting concept. In certain configurations of catalytic fuel tank inerting systems, recirculation of reactor exhaust gas may be used for reactor thermal management. That is, a portion of the exhaust gas from the catalytic reactor may be recycled or reused to control thermal conditions of the catalytic reactor. This operation is enabled by the catalytic reaction during operation which generates heat, and such heat being employed to control thermal conditions of the catalytic reactor. However, there may be cases where the bleed air temperature is not high enough to initiate reaction on the catalyst at the system design point. That is, when initiating the start of the reaction within the catalytic reactor, temperatures may not be high enough to start the catalytic process.

To achieve a desired (or necessary) light-off capability, various mechanisms are proposed herein, wherein embodiments of the present invention are directed to increasing a light-off capability of a catalyst of catalytic fuel tank inerting system. Further, some embodiments of the present disclosure are directed to enabling efficient and safe shutdown of aircraft inerting systems.

Figure 3:
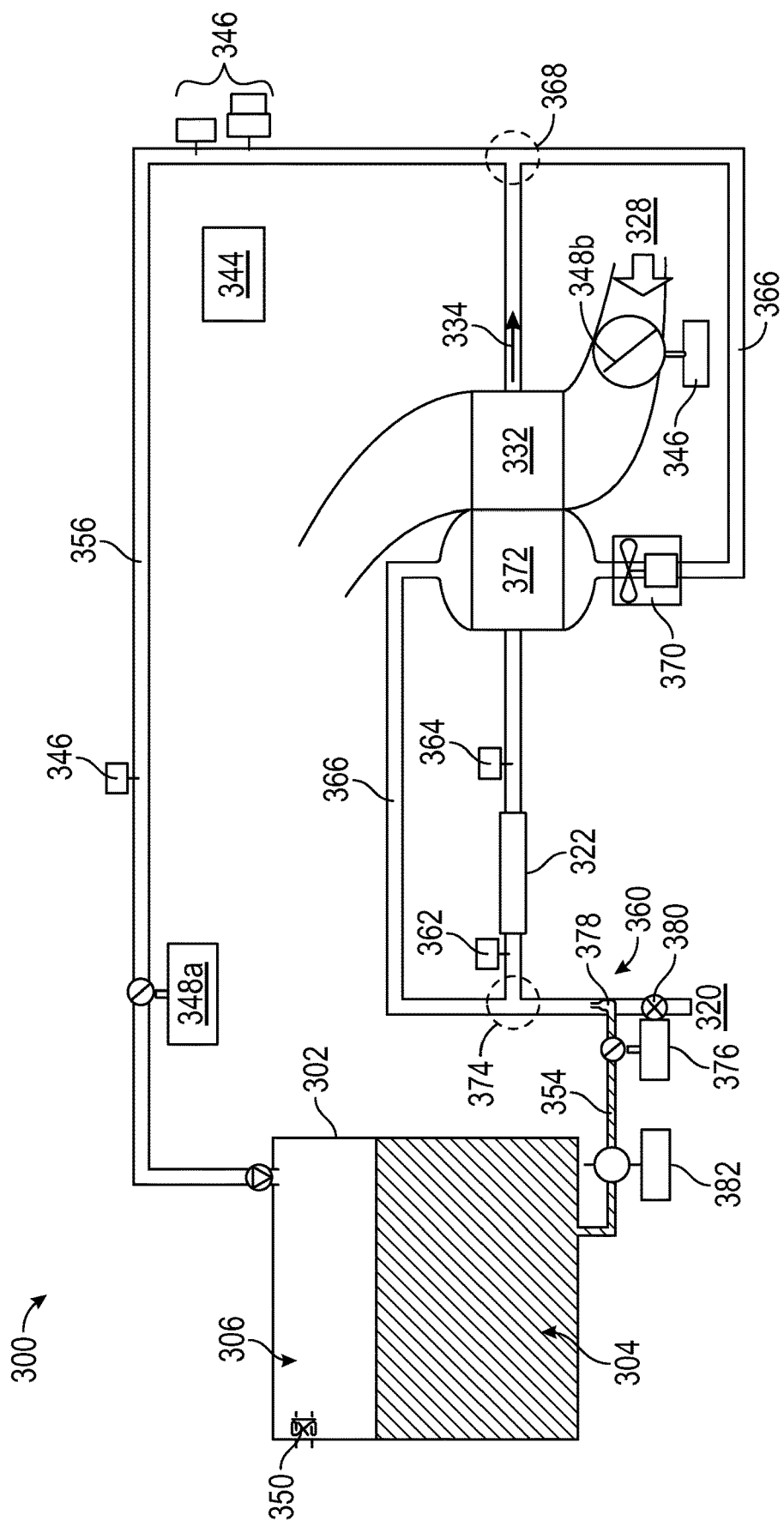
FIG. 3 is a schematic illustration of a fuel tank inerting system in accordance with an embodiment of the present disclosure.

For example, turning now to FIG. 3, an embodiment of an inerting system 300 in accordance with the present disclosure is shown. The inerting system 300 may be similar to that shown and described above, and thus similar features may not be shown or discussed for simplicity. The inerting system 300 enables control of an operating temperature of a catalytic reactor 322, specifically at a time of light-off and after light-off has been achieved.

As shown, the inerting system 300 includes a fuel tank 302 having fuel 304 therein, with an ullage space 306 formed as fuel 304 is consumed during use. In this embodiment, an inerting supply line 354 fluidly connects the fuel tank 302 to a metering valve system 360 which can inject fuel, i.e., a first reactant, into a second reactant that is sourced from a second reactant source 320. Thus the first reactant and the second reactant may be mixed. The mixed first and second reactants are then reacted within the catalytic reactor 322 to generate an inert gas for supply into one or more fuel tanks (e.g., fuel tank 302). In this embodiment, a cool air source 328, such as ram air, is provided to enable the condensing function within a heat exchanger 332, as described above. The heat exchanger 332 operates as a condenser on the catalyzed mixture to separate out an inert gas and a byproduct, such as water. The inert gas is then passed along a fuel tank supply line 356 to supply the inert gas 334 to the fuel tank 302.

The fuel tank 302 includes a vent 350. The vent 350 can be passive or active to allow for venting of gas within the ullage 306 to vent out of the fuel tank 302. For example, in some embodiments, the vent 350 can enable venting of gas (and thus pressure) from within the fuel tank 302 and/or pressure that may build within the inerting system 300 (i.e., within the conduits thereof). In embodiments in which the vent 350 is passive, operation of the vent 350 may be based upon a pressure within the ullage 306. In other embodiments where the vent 350 is actively controlled, a controller, as described herein, may selectively control operation of the vent 350. Further, in some embodiments, the vent 350 may operate both in a passive and active manner, allowing for control during some operations but also enabling venting if a pressure within the ullage 306 exceeds a threshold of the vent 350.

The inerting system 300 further includes a controller 344 that may be operably connected to the various components of the inerting system 300, including, but not limited to, the valves 348a, 348b, the sensors 346, and, optionally, the vent 350, that are arranged at various locations to enable control of the inerting system 300 (e.g., to control fluid flow therethrough). The controller 344 can be configured to receive input from the sensors 346 to control the valves 348a, 348b and thus maintain appropriate levels of inert gas 334 within the ullage space 306. Further, the controller 344 can be arranged to control a start-up (e.g., light-off) operation of the catalytic reactor 322, ensure the reaction therein is maintained after light-off, and perform a shutdown operation thereof.

As shown, an inlet sensor 362 is arranged upstream of the catalytic reactor 322 and an outlet sensor 364 is arranged downstream from the catalytic reactor 322. The inlet and outlet sensors 362, 364 may be operably connected to the controller 344 such that the controller 344 can monitor inlet and outlet temperatures of the catalytic reactor 322. When the catalytic reactor 322 is generating an inert gas, the outlet temperature will be higher than the inlet temperature. However, if the catalytic reactor 322 is not operating, the inlet and outlet temperatures will be substantially similar. Thus, the controller 344 can monitor the operating status of the catalytic reactor 322. Moreover, because the inlet temperature can be monitored, the controller 344 can determine if the temperature of the mixed gas entering the catalytic reactor 322 is of sufficient temperature to cause light-off.

Once in operation, the catalytic process may be maintained, in part, through the use of a recirculation loop 366. The recirculation loop 366 is configured to extract a portion of the inert gas downstream from the catalytic reactor 322 at a first junction 368. This extracted gas is recycled back to the inlet through the recirculation loop 366. A driving mechanism 370 drives the recycled gas through the recirculation loop, passes the recycled gas through a recirculation heat exchanger 372 and then mixes the recycled gas back into the mixed first and second reactants at a second junction 374. The recirculation heat exchanger 372 is configured to thermally interact the recycled gas with the outlet gas from the catalytic reactor 322, thus heating the recycled gas. The heated recycled gas is mixed with the first and second reactants to control the temperature thereof in order to maintain an operational temperature of the catalytic reactor 322 to maintain the reaction therein. It will be appreciated that some embodiments of the catalytic process may be practiced without the need for recirculation.

If the temperature at the inlet is too low, when inert gas is required to be provided to a fuel tank, the catalytic process may not initiate. As such, the controller 344 is configured to adjust the light-off temperature, in this example embodiment, by adjusting the AFR upstream of the catalytic reactor 322. To achieve this, the controller 344 is configured to control the metering valve system 360. The metering valve system 360 includes a fuel valve 376 and a nozzle 378 (collectively a "first reactant control element"), with the nozzle 378 arranged to inject the first reactant (fuel) into the second reactant. The fuel valve 376 is controllable to meter an amount of fuel that is injected into the stream of the second reactant. The metering valve system 360 further may include an optional second reactant control valve 380, which can be controlled to meter an amount of second reactant sourced from the second reactant source.

By controlling the metering valve system 360, the controller 344 can manipulate the AFR, by increasing or decreasing a rate of fuel injected into the second reactant stream through controlling the fuel valve 376 and a nozzle 378. In some embodiments, the fuel valve 376 and a nozzle 378 may be a single structure, and in other embodiments (such as shown) the fuel valve 376 and a nozzle 378 may be separate devices or elements. In some embodiments, the second reactant control valve 380 may be an air metering valve that is configured to enable control of an amount of air sourced from the second reactant source 320, thus also impacting the AFR at the inlet to the catalytic reactor 322. In some such embodiments, the first reactant flow rate control elements (e.g., fuel valve 376) may be eliminated, and the AFR is controlled by the amount of second reactant introduced into the system upstream of the catalytic reactor 322.

In operation, the fuel valve 376 (e.g., a variable position fuel metering valve) can be controlled to temporarily increase the first reactant (e.g., fuel) flow rate to the system to initiate catalyst light-off. That is, as the first reactant flow rate is increased, the light-off temperature will decrease. As the light-off temperature decreases, due to the increased percentage of first reactant, light-off is more likely to occur. Once light-off occurs, the controller 344 may detect an increase in temperature at the outlet sensor 364 downstream from the catalytic reactor 322. The increased temperature may be indicative of light-off and initiation of the catalytic reactions within the catalytic reactor 322. When such increased temperatures are detected, the controller 344 may reduce the flow rate of the first reactant by controlling the metering valve system 360. That is because the temperature required to sustain the reaction within the catalytic reactor 322 may be lower than that needed to initiate reaction.

An optional component, as shown, may be a pump 382 that may be arranged between the fuel tank 302 (e.g., first reactant source) and the nozzle 378. The pump 382 may be controlled by the controller 344 to enable further control of the flow rate of the first reactant into the second reactant upstream of the catalytic reactor 322.

In order for fuel to be converted into components that can be used to inert a fuel tank, as described above, the catalytic reactor must be above a temperature limit (i.e., to enable catalyzing of the gases). During a startup or light off phase (e.g., warming period), the warm air should be prevented from being delivered to the fuel tank ullage and no fuel should be mixed into the catalyzer. Embodiments of the present disclosure are directed to processes for performing warming or startup process and/or shutting down the system processes. The processes described herein may be implemented with a system as shown and described with respect to FIG. 3, and thus the following description may make reference to the configuration and elements described with respect to FIG. 3.

The process for starting up and shutting down the system shown above may be described as series of seven states. As provided herein, in accordance with some embodiments, an OFF state is a state when all actuators are closed and the system is off. The actuators that are closed include the valves 348a, 348b, with one valve being a flow control valve 348a proximate an inlet into the ullage 306 and another valve being a ram air control valve 348b that controls cooling flow through a condenser (i.e., heat exchanger 332). The closed actuators can also include the second reactant control valve 380 and/or a first reactant control element (including e.g., fuel valve 376 and/or nozzle 378). With all actuators (or valves) closed, a closed circuit exists that includes the fuel tank supply line 356, the recirculation loop 366, and the flow path through the catalytic reactor 322, the recirculation heat exchanger 372, and the heat exchanger 332.

From the OFF state, the inerting system 300 may be controlled in a CIRCULATE state. In the CIRCULATE state, the driving mechanism 370 in the recirculation loop is turned on and operated. During the CIRCULATE state all other actuators remain off or closed. As such, the gas that is trapped within the closed circuit may be circulated, with at least a portion of the circulating gas flowing through the catalytic reactor 322. During this state, the driving mechanism 370 will generate waste heat merely through operation. Such waste heat will cause the temperature within the inerting system 300 to be raised. It will be appreciated that such configuration is not to be limiting, and other mechanisms or means for heating or warming the inerting system may be employed, in combination or alternatively, without departing from the scope of the present disclosure. For example, waste heat from other systems or components on an aircraft may be employed. Additionally, or alternatively, specific heaters (whether mechanical, electrical, or chemical) may be employed to raise the temperature within the inerting system. Thus, the present disclosure is not to be limited by the specific illustrative embodiments shown and described.

Next, the system may be controlled in a PRIME state. In the PRIME state, the ram air control valve 348b is controlled or modulated (e.g., aperture or flow rate opening) until an inlet temperature of the catalytic reactor reaches a predetermined temperature, such as a light-off temperature. In some embodiments, for example, this temperature may be monitored by the inlet sensor 362. The control or modulation of a valve or actuator, as used herein, refers to a controlled operation of opening, closing, maintaining a given open/closed state, and/or varying an open/closed state (e.g., partially open/partially closed) of the respective valve or actuator. In some embodiments, for example, this temperature may be monitored by the outlet sensor 364.

Next, a CATWARM state may be entered, wherein the temperature of the catalytic reactor is monitored to ensure that light-off and/or reactions may occur. The CATWARM state is employed to determine that the catalytic reactor is warm enough. This state may be performed for a predetermined time period to ensure that the temperature of the catalytic reactor is above a predetermined limit for a specific duration.

When it is determined in the CATWARM state that the temperature is sufficient, the inerting system 300 may be switched into an ON state. In the ON state, all of the actuators in the system are modulated (e.g., opened, closed, partially opened, partially closed, and/or transitions therebetween) or turned on to begin the process of inerting the fuel tanks on the plane (e.g., the flow control valve 348a, the second reactant control valve 380, and the first reactant control element (valve 376 and/or nozzle 378). The ON state may be employed or maintained for the duration that inert gas is required to be supplied into the ullage 306 of the fuel tank 302. Further, in some embodiments of the present disclosure, the ram air control valve 348a may be in a partially opened or fully opened state during the ON state.

When it is determined, e.g., by the controller 344, that the inerting system 300 should be stopped or cease production of inerting gas, the inerting system 300 is switched into a DEPRESSURIZE stated. In the DEPRESSURIZE state, the vent 350 may be opened and/or the second reactant control valve 380 connecting the pressurized source of air is closed to allow the pressure in the inerting system 300 to vent to ambient. Furthermore, in the DEPRESSURIZE state, fuel is stopped from entering the catalytic reactor. This may be achieved by closing the first reactant control element. Further, in some embodiments of the present disclosure, the ram air control valve 348b may be in a partially opened or fully opened state during the DEPRESSURIZE state. In some such embodiments, the ram air control valve 348b may be opened a greater amount in the DEPRESSURIZE state than in the ON state to increase a cooling flow therethrough.

Finally, the inerting system 300 may be controlled to enter a COOLDOWN state. In the COOLDOWN state, the driving mechanism 370 continues to circulate gas within the inerting system 300 until the catalytic reactor 322 cools down sufficiently (e.g., as monitored by the inlet and outlet temperature sensors 362, 364). In the COOLDOWN state, the flow control valve 348a may be closed to prevent gas from within the inerting system 300 to enter the ullage 306 of the fuel tank 302. From this state, the inerting system can transition back to the OFF state, described above.

Figure 4:
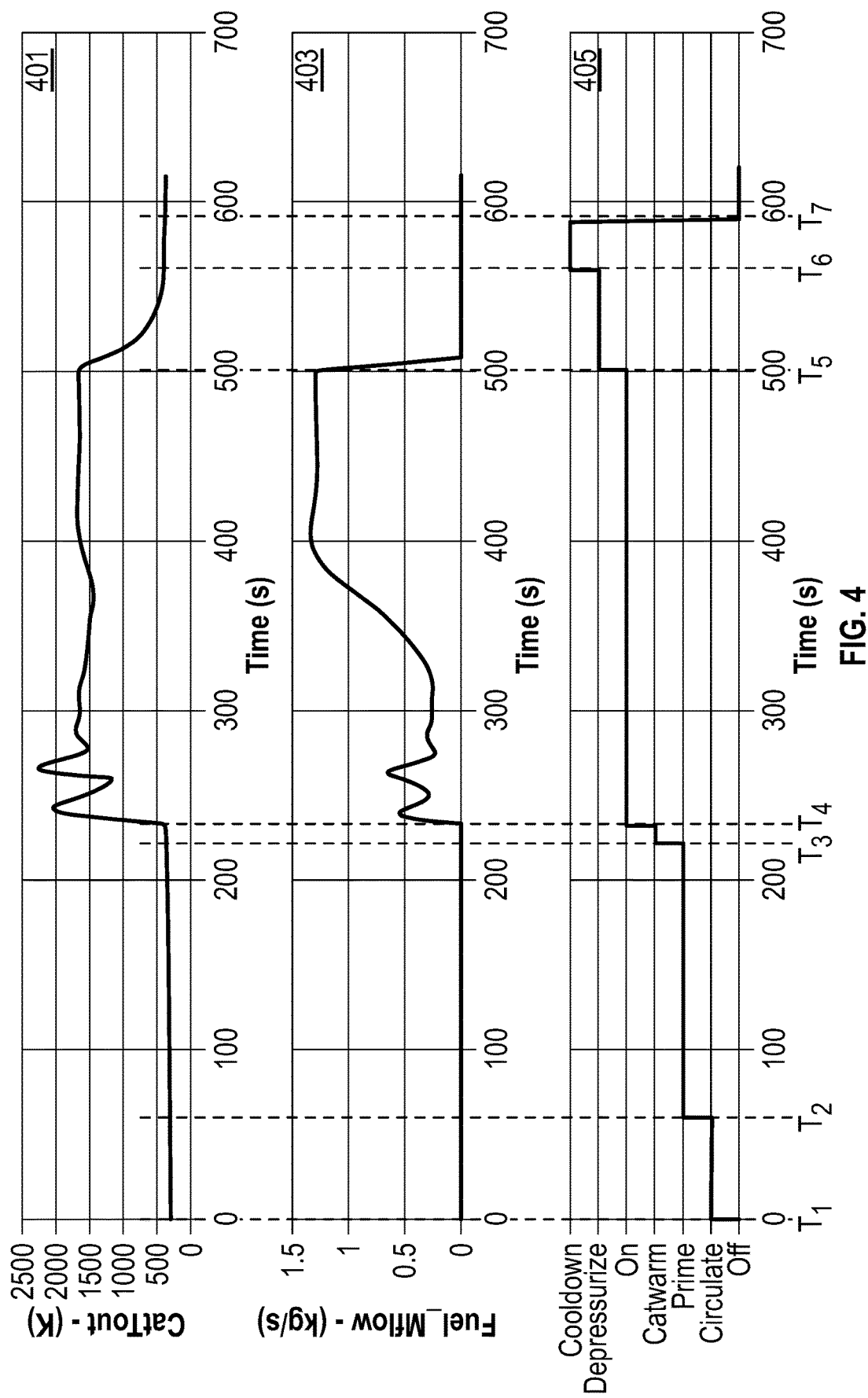
FIG. 4 is a series of plots representing properties of a fuel tank inerting system in accordance with an embodiment of the present disclosure.

A model of the system and process of control outlined above is illustrated in the plots of FIG. 4. In each of the plots 401, 403, 405 of FIG. 4, the horizontal axis is aligned and represents arbitrary units of time. Plot 401 represents a temperature at an outlet of a catalytic reactor over time in accordance with an embodiment of the present disclosure (e.g., using outlet temperature sensor 362, shown in FIG. 3). Plot 403 represents a fuel mass flow over time within the inerting system (e.g., from the fuel tank 302 to the catalytic reactor 322). FIG. 405 represents a given state of the inerting system (e.g., the states described above).

At a first time $T_1$, the inerting system is transitioned from the OFF state to the CIRCULATE state. At a second time $T_2$, the inerting system is transitioned to the PRIME state. At a third time $T_3$, the inerting system is transitioned to the CATWARM state. At a fourth time $T_4$, the inerting system is transitioned to the ON state. It is noted that the fuel mass flow remains at zero from the first time $T_1$ to the fourth time $T_4$, which is due to the valves/actuators being closed, and only the recirculation device being active—but no fuel is being injected or added into the system during these states. However, as shown, through these states, from the first time $T_1$ to the fourth time $T_4$, the temperature gradually increases, until a critical or predetermined temperature is achieved, which is indicated at the fourth time $T_4$, where the system is transitioned into the ON state (when all actuators/valves are open and inerting gas is being generated. As illustratively shown, immediately after the ON state is achieved, the temperature may spike and fluctuate until a steady state of inerting gas generation is achieved.

The ON state may be maintained until a fifth time $T_5$, when it is determined that the inerting system should be shut off or powered down. At the fifth time $T_5$, the inerting system is transitioned into the DEPRESSURIZE state, which includes closing of the fuel supply valve (e.g., fuel valve 376, nozzle 378), and thus the fuel mass flow drops to zero shortly after the fifth time $T_5$. Further, because the fuel is no longer supplied and the pressure is released from the system, the temperature will drop rapidly after the fifth time $T_5$ during the depressurize state. At a sixth time $T_6$, the inerting system is transitioned into the COOLDOWN state. During the COOLDOWN state, the fuel mass flow is zero and the temperature cools or stabilizes at a relatively low temperature (i.e., below the lightoff temperature). Finally, at a seventh time $T_7$, the inerting system is transitioned into the OFF state.

Figure 5:
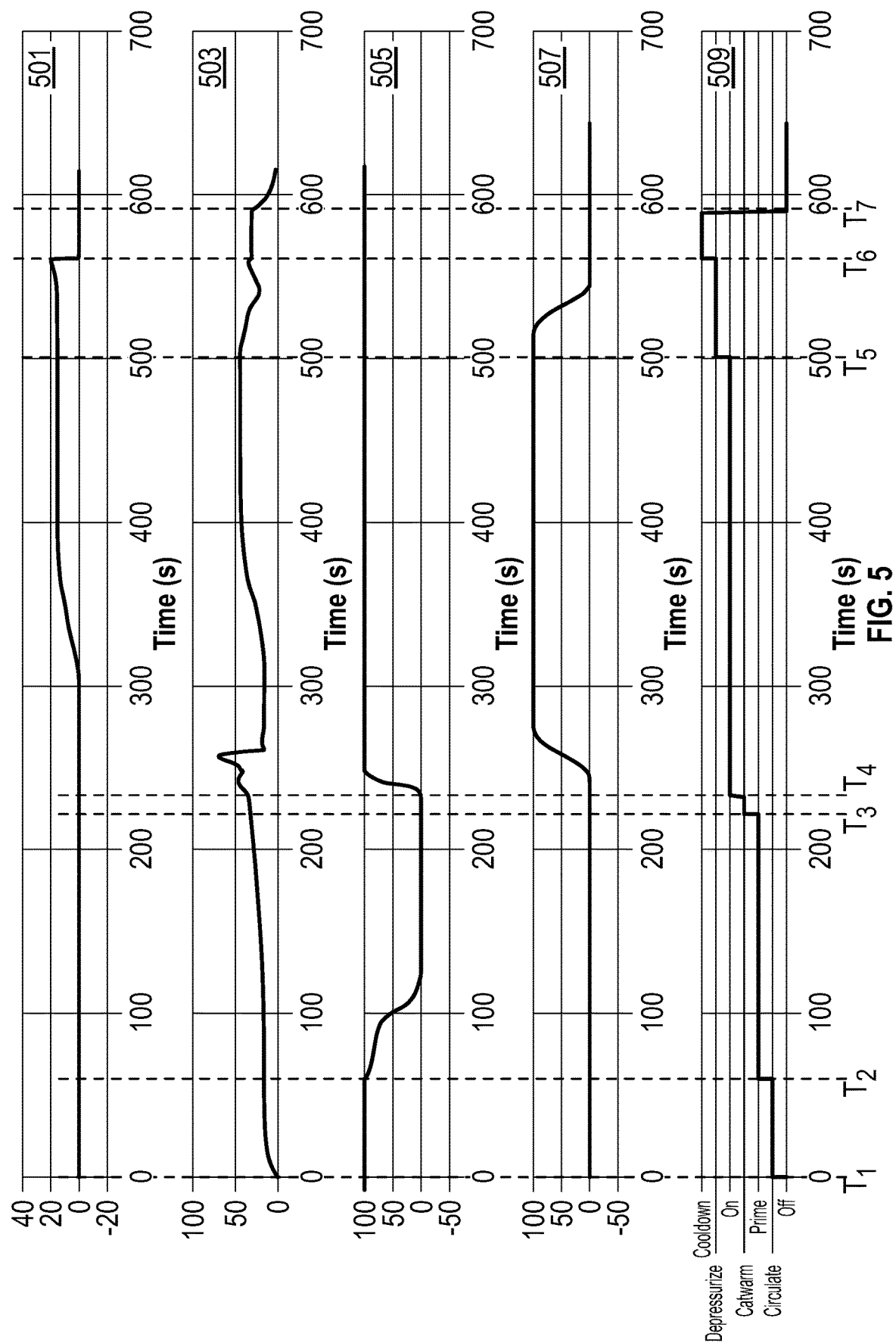
FIG. 5 is a series of plots represents states of components of a fuel tank inerting system in accordance with an embodiment of the present disclosure.

Turning now to FIG. 5, a series of plots illustrating positions or states of valves/actuators of an inerting system controlled in accordance with an embodiment of the present disclosure are shown. The plots 501, 503, 505, 507, 509 correlate valve states with respect to time (horizontal axis) and states of the inerting system, as shown in plot 509 which has the same time periods as that shown and described with respect to FIG. 4, and thus a detailed description of such time periods will be omitted here. Plot 501 represents a state of a first reactant control element (e.g., fuel valve 376 and/or nozzle 378 shown in FIG. 3). Plot 503 represents a rotational or fan speed of a driving mechanism (e.g., driving mechanism 370). Plot 505 represents a state of a ram air control valve (e.g., ram air control valve 348b). Plot 507 represents a state of a second reactant control valve (e.g., second reactant control valve 380). In each of the plots 501, 505, 507, a closed position of the valve is at 0, with an opening set at positive or negative on the respective plots. In plot

503, representing the fan speed, the base valve is zero (i.e., "off"), with speeds only being positive therefrom.

In FIG. 5, the positions of three valves and the operating speed of the driving mechanism are plotted against time (and the operating states of an inerting system in accordance with an embodiment of the present disclosure). In plot 501, the first reactant control element valve is not turned on after the catalytic reactor temperature has achieved a high enough, and thus not until sometime during the ON state. In plot 505, the ram air control valve is seen to only need modulation to warm up the catalytic reactor (i.e., during the PRIME, CATWARM, and beginning of the ON state). By closing down completely and allowing the driving mechanism to circulate gas within the inerting system, waste heat from the driving mechanism builds while limiting heat transfer to ambient.

Figure 6:
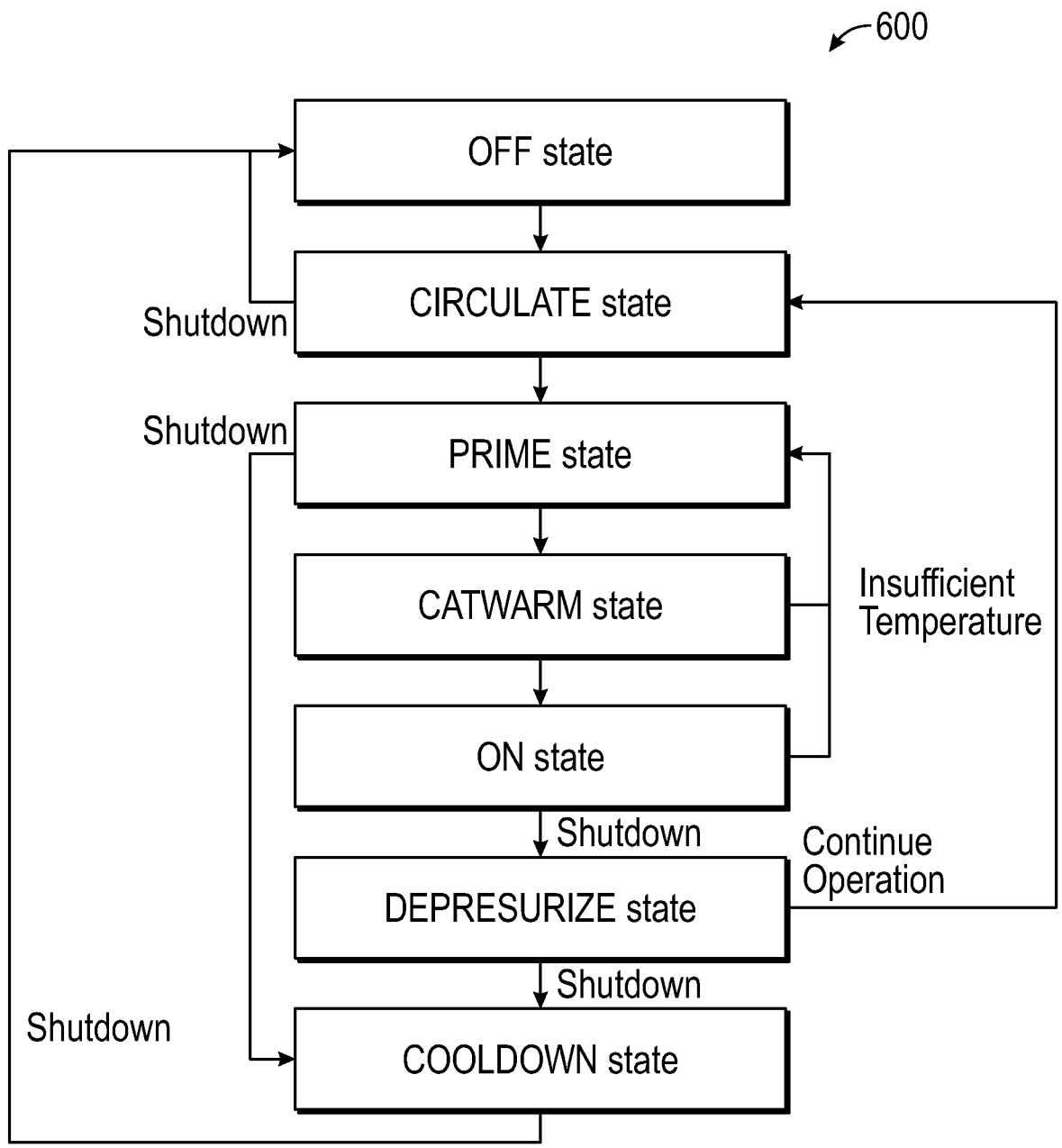
FIG. 6 is a flow process of a fuel tank inerting system in accordance with an embodiment of the present disclosure.

A more detailed example of the different states of operation of an inerting system in accordance with an embodiment of the present disclosure is provided here. The following description is merely for example and explanatory purposes and is not intended to be limiting. Further, the following description is provided with an illustrative flow process 600 shown in FIG. 6.

As an initial state, the inerting system is in the OFF state. In the OFF state, an inlet valve is fully closed (e.g., second reactant control valve 380), a ram air control valve is fully open (e.g., ram air control valve 348*b*), a fan/compressor is off (e.g., driving mechanism 370), a flow control valve is fully closed (e.g., flow control valve 348*a*), and a first reactant control element to the catalytic reactor is off (e.g., fuel valve 376 and/or nozzle 378).

When the inerting system is commanded to startup (e.g., using the controller 344), the inerting system transitions from the OFF state to the CIRCULATE state. In the CIRCULATE state, the inlet valve is fully closed, the ram air control valve is fully open, the fan/compressor is on and modulating to a flow reference, the flow control valve is fully closed, and the fuel flow to the reactor is off.

If the inerting system is commanded to shut down while in the CIRCULATE state, the inerting system reverts back to the OFF state, and the actuator states thereof. However, after a period of time has elapsed after the CIRCULATE state, the inerting system may transition to the PRIME state. In the PRIME state, the inlet valve is fully closed, the ram air control valve is modulated (e.g., fully closed or partially closed) to a temperature reference at the inlet of the reactor that is sufficient for catalysis to take place, the energy of the fan/compressor supplies the increase in temperature needed through heat of compression and waste heat while the ram air control valve reduces the loss of heat to the ambient atmosphere, the fan/compressor is on and modulating to a flow reference, the flow control valve is fully closed, and the fuel flow to the reactor is off.

If the inerting system is commanded to shut down while in the PRIME state, the inerting system transitions to the COOLDOWN state (see below). However, if no shut down is commanded, once the inlet temperature to the catalytic reactor is at or above the temperature for catalysis, the inerting system transitions to the CATWARM state. In the CATWARM state the actuator, valve, and driving mechanism are all maintained as that described with respect to the PRIME state, described above.

If the inlet temperature to the catalytic reactor goes below the temperature for catalysis while in the CATWARM state, the inerting system returns to the PRIME state. If the inerting system is commanded to shut down while in the CATWARM state, the inerting system transitions to the COOLDOWN state (see below). However, after a period of time has elapsed and the CATWARM state indicates operational temperatures at the outlet to the catalytic reactor, the inerting system transitions to the ON state. In the ON state, the inlet valve is fully open, the ram air control valve continues to modulate to the inlet temperature reference needed for catalysis, the fan/compressor is on and modulating to a flow reference, the flow control valve is modulated to a flow reference to deliver sufficient inert gas to the fuel tank, and the fuel flow to the reactor is modulated to a reactor outlet temperature reference.

If the inlet temperature of the catalytic reactor drops below the temperature of catalysis for a period of time during the ON state, the inerting system with revert to the PRIME state. If the inerting system is commanded to shut down while in the ON state, the inerting system transitions to the DEPRESSURIZE state. In the DEPRESSURIZE state, the inlet valve is fully closed, the ram air control valve is fully open, the fan/compressor is on and modulating to a flow reference, the flow control valve remains open while the pressure in the system decays to ambient through the ventilation of the fuel tank, and the fuel flow to the reactor is off.

If the inerting system is commanded to continue generating inerting gas while in the DEPRESSURIZE state, the inerting system transitions to the CIRCULATE state after a period of time has elapsed. If the inerting system has not been commanded back on, after a period of time has elapsed, the inerting system transitions to the COOLDOWN state. In the COOLDOWN state, the inlet valve is fully closed, the ram air control valve is fully open, the fan/compressor is on and modulating to a flow reference, the flow control valve is fully closed, and the fuel flow to the reactor is off.

If the inerting system is commanded back on while in the COOLDOWN state, the inerting system reverts to the CIRCULATE state. However, after the outlet temperature of the catalytic reactor has cooled below a safe level (e.g., predetermined temperature), and the outlet temperature has not been commanded back on, the outlet temperature transitions to the OFF state (described above).

Advantageously, embodiments of the present disclosure provide for improved and efficient light-off and shutdown operations for inerting systems on aircraft. Advantageously, embodiments of the present disclosure can prevent hot air from being delivered to the fuel tanks by keeping the inerting systems isolated with a flow control valve and using the waste heat of the fan to raise the temperature of the catalytic reactor. Also, during shutdown, the system is allowed to depressurize and cool down in a rapid and safe manner due to the process.

The use of the terms "a," "an," "the," and similar references in the context of description (especially in the context of the following claims) are to be construed to cover both the singular and the plural, unless otherwise indicated herein or specifically contradicted by context. The modifier "about" and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description, but is only limited by the scope of the appended claims.

What is claimed is:

1. A fuel tank inerting system for an aircraft, the system comprising:
    a fuel tank;
    a first reactant source fluidly connected to the fuel tank, the first reactant source arranged to receive fuel from the fuel tank, the first reactant source having a first reactant control element controlling flow thereof;
    a second reactant source having a second reactant control valve controlling flow thereof;
    a catalytic reactor arranged to receive a first reactant from the first reactant source and a second reactant from the second reactant source to generate an inert gas to be supplied to the fuel tank to fill an ullage space of the fuel tank;
    a heat exchanger arranged between the catalytic reactor and the fuel tank and configured to at least one of cool and condense an output from the catalytic reactor to separate out the inert gas;
    a ram air control valve configured to control flow of ram air into the heat exchanger;
    a recirculation loop having a driving mechanism therein, configured to drive a flow of gas through the fuel tank inerting system;
    a flow control valve arranged between the catalytic reactor and the ullage space, the flow control valve configured to control a flow of inert gas into the ullage space; and
    a controller configured to control operation of (i) the first reactant control element, (ii) the second reactant control valve, (iii) the ram air control valve, (iv) the driving mechanism, and (v) the flow control valve, the controller configured to control a state of the fuel tank inerting system, wherein states of the fuel tank inerting system comprise at least an OFF state, wherein, in the OFF state, the second reactant control valve is fully closed, the ram air control valve is fully open, the driving mechanism is off, the flow control valve is fully closed, and the first reactant control element is off.

2. The system of claim 1, further comprising a recirculation heat exchanger arranged within the recirculation loop and configured to thermally connect a flow through the recirculation loop and a flow exiting the catalytic reactor.

3. The system of claim 1, wherein the states of the fuel tank inerting system further include a CIRCULATE state where the second reactant control valve is fully closed, the ram air control valve is fully open, the driving mechanism is on, the flow control valve is fully closed, and the first reactant control element off.

4. The system of claim 3, wherein operation of the driving mechanism causes a temperature within the fuel tank inerting system to increase.

5. The system of claim 4, wherein the temperature increase is caused by waste heat generated by the driving mechanism.

6. The system of claim 1, wherein the states of the fuel tank inerting system further include a PRIME state where the second reactant control valve is fully closed, the ram air control valve is modulated to cause a temperature at an inlet of the catalytic reactor to reach a lightoff temperature, the driving mechanism is on, the flow control valve is fully closed, and the first reactant control element is off.

7. The system of claim 1, wherein the states of the fuel tank inerting system further include a CATWARM state where the second reactant control valve is fully closed, the ram air control valve is modulated to cause a temperature at an inlet of the catalytic reactor to reach a lightoff temperature, the driving mechanism is on, the flow control valve is fully closed, and the first reactant control element is off.

8. The system of claim 7, wherein a temperature at an outlet of the catalytic reactor is monitored for a predetermined period of time.

9. The system of claim 1, wherein the states of the fuel tank inerting system further include an ON state where the second reactant control valve is fully open, the ram air control valve is open, the driving mechanism is on, the flow control valve is open, and the first reactant control element is operated to supply fuel to the catalytic reactor.

10. The system of claim 1, wherein the states of the fuel tank inerting system further include a DEPRESSURIZE state where the second reactant control valve is fully closed, the ram air control valve is open, the driving mechanism is on, the flow control valve is open, and the first reactant control element is off.

11. The system of claim 1, wherein the states of the fuel tank inerting system further include a COOLDOWN state where the second reactant control valve is fully closed, the ram air control valve is fully open, the driving mechanism is on, the flow control valve is fully closed, and the first reactant control element is off.

12. A method of controlling operation of a fuel tank inerting system of an aircraft, the method comprising:
    controlling a state of (i) a first reactant control element, (ii) a second reactant control valve, (iii) a ram air control valve, (iv) a driving mechanism, and (v) a flow control valve to control a state of the fuel tank inerting system, wherein states of the fuel tank inerting system comprise at least an OFF state where the second reactant control valve is fully closed, the ram air control valve is fully open, the driving mechanism is off, the flow control valve is fully closed, and the first reactant control element is off.

13. The method of claim 12, wherein the states of the fuel tank inerting system further include a CIRCULATE state where the second reactant control valve is fully closed, the ram air control valve is fully open, the driving mechanism is on, the flow control valve is fully closed, and the first reactant control element off.

14. The method of claim 12, wherein the states of the fuel tank inerting system further include a PRIME state where the second reactant control valve is fully closed, the ram air control valve is modulated to cause a temperature at an inlet of a catalytic reactor to reach a lightoff temperature, the driving mechanism is on, the flow control valve is fully closed, and the first reactant control element is off.

15. The method of claim 12, wherein the states of the fuel tank inerting system further include a CATWARM state where the second reactant control valve is fully closed, the ram air control valve is modulated to cause a temperature at an inlet of a catalytic reactor to reach a lightoff temperature, the driving mechanism is on, the flow control valve is fully closed, and the first reactant control element is off.

16. The method of claim 12, wherein the states of the fuel tank inerting system further include an ON state where the second reactant control valve is fully open, the ram air control valve is open, the driving mechanism is on, the flow control valve is open, and the first reactant control element is operated to supply fuel to a catalytic reactor.

17. The method of claim 12, wherein the states of the fuel tank inerting system further include a DEPRESSURIZE state where the second reactant control valve is fully closed, the ram air control valve is open, the driving mechanism is on, the flow control valve is open, and the first reactant control element is off.

18. The method of claim 12, wherein the states of the fuel tank inerting system further include a COOLDOWN state where the second reactant control valve is fully closed, the ram air control valve is fully open, the driving mechanism is on, the flow control valve is fully closed, and the first reactant control element is off.

19. A method of controlling operation of a fuel tank inerting system of an aircraft, the method comprising:
controlling a state of (i) a first reactant control element, (ii) a second reactant control valve, (iii) a ram air control valve, (iv) a driving mechanism, and (v) a flow control valve to control a state of the fuel tank inerting system, wherein states of the fuel tank inerting system comprise at least an ON state where the second reactant control valve is fully open, the ram air control valve is open, the driving mechanism is on, the flow control valve is open, and the first reactant control element is operated to supply fuel to a catalytic reactor.

* * * * *